Jan. 24, 1967  O. K. NILSSEN  3,300,619

HEATING SYSTEM FOR AN AUTOMOTIVE VEHICLE

Original Filed May 7, 1962  3 Sheets-Sheet 1

OLE K. NILSSEN
INVENTOR

BY John C. Faulkner
Keith L. Zerschling
ATTORNEYS

Jan. 24, 1967  O. K. NILSSEN  3,300,619
HEATING SYSTEM FOR AN AUTOMOTIVE VEHICLE
Original Filed May 7, 1962  3 Sheets-Sheet 2

OLE K. NILSSEN
INVENTOR

BY

ATTORNEYS

Jan. 24, 1967       O. K. NILSSEN       3,300,619
HEATING SYSTEM FOR AN AUTOMOTIVE VEHICLE
Original Filed May 7, 1962                3 Sheets-Sheet 3

OLE K. NILSSEN
INVENTOR

BY
ATTORNEYS

United States Patent Office 3,300,619
Patented Jan. 24, 1967

3,300,619
HEATING SYSTEM FOR AN AUTOMOTIVE VEHICLE
Ole K. Nilssen, Livonia, Mich., assignor to Ford Motor Company, Dearborn, Mich., a corporation of Delaware
Continuation of application Ser. No. 192,790, May 7, 1962. This application Mar. 4, 1964, Ser. No. 350,142
18 Claims. (Cl. 219—279)

This application is a continuation of my copending application Serial Number 192,790, filed May 7, 1962, now abandoned.

This invention relates to an improved heating system. More particularly, this invention relates to an improved heating system for an automotive vehicle.

It is a common human experience to enter an automobile in cold weather and be uncomfortably cold for what seems to be a considerable period. The reason for this can be attributed to the fact that most automotive vehicles presently utilize radiator heating systems which have the disadvantage of taking an excessively long time before producing heat in any significant amount. The desirability of improving the response time of present automotive vehicle heating systems has been sought for quite some time in the heating art and it appears from the prior art that to date a practical and inexpensive system has not been developed. The importance of improving the response time of the radiator heater system is emphasized by Table I below which shows that statistically most trips taken in an automotive vehicle are short ones; so short, in fact, that in over 60 percent of the cases, the conventional radiator heater will scarcely have time to warm up.

TABLE I.—PERCENTAGE OF AUTOMOBILE TRIPS FOR DIFFERENT DISTANCES

| Trip Length (One Way) | To and From Work | Medical and Dental | Shopping | Vacation | All Purposes |
|---|---|---|---|---|---|
| | Percent | Percent | Percent | Percent | Percent |
| Under 5 miles | 67.6 | 42.3 | 76.1 | 10.7 | 61.7 |
| 5-9 | 17.4 | 18.1 | 16.7 | 1.3 | 18.9 |
| 10 and over | 15.0 | 39.6 | 7.2 | 88.0 | 19.4 |

(Taken from table in Automobile Facts and Figures, 1954.)

The instant invention is dedicated to improving the response time and virtually eliminating the warm-up period in present day radiator heater system. The invention utilizes a means capable of instantly supplying heat to the passenger compartment. The instant heat or quick heat means cooperates with the well-known radiator type of heating element and is generally operative during the warm-up period of automotive vehicle operation. When the operating temperature of the automotive vehicle reaches a point at which adequate heat is supplied to the passenger compartment by the radiator heating element, the operation of the quick heat means will be automatically or manually terminated.

The preferred embodiment of the invention utilizes electric heating coils controlled by a control circuit that may take the form of a five-pole switch which is automatically operated to energize the electric heating coils when the radiator heating element is not contributing substantial amounts of heat to the passenger compartment. The control circuit also enables the electrical generator of the automotive vehicle to operate in an unregulated mode when the electric quick heat coils are operative. The utilization of an unregulated generator provides a maximum amount of electrical energy for heating the passenger compartment. The circuit may utilize a sensing means or a temperature sensitive element for sensing when the automotive vehicle has warmed up to a temperature at which the temperature of the passenger compartment can be maintained by the radiator heating element. At this temperature, the temperature sensitive element will actuate the five-pole switch to effectively remove the electric quick heat coils from the circuit and terminate the unregulated mode of generator operation.

The general object of the invention is the provision of a heating system for an automotive vehicle which will instantaneously heat the passenger compartment;

Another object of the invention is the provision of a quick heat system having a control circuit that enables the generator of the automotive vehicle to operate in an unregulated mode, thereby providing a maximum amount of electrical energy to the electric quick heat means;

Another object of the invention is the provision of an electric quick heat system that can be adapted to the existing automotive vehicle heating systems at a minimum cost;

Other objects and advantages will become obvious as the specification is read in connection with the drawings wherein.

Figure 1:
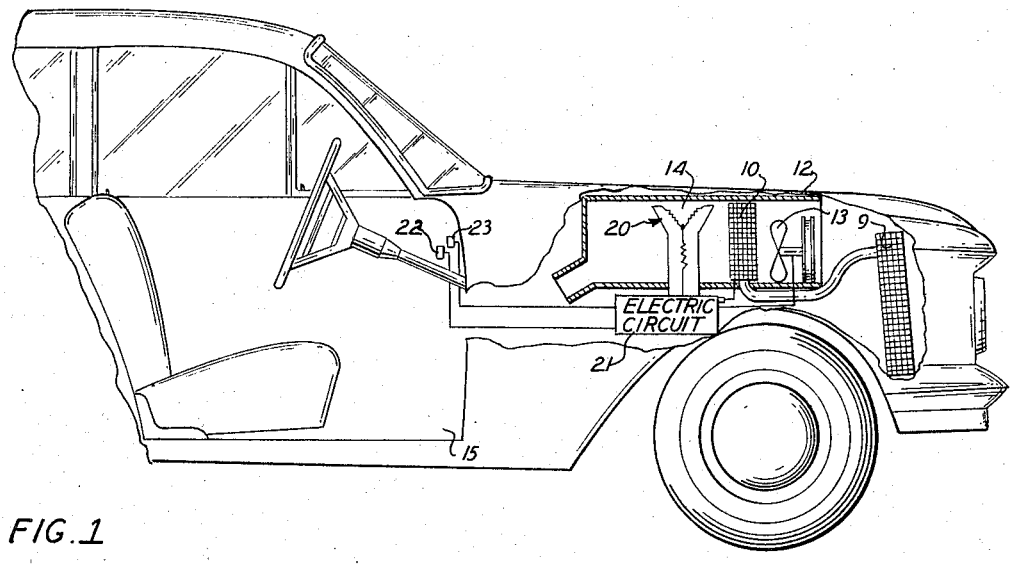
FIGURE 1 is a schematic diagram of the electric quick heat system in the automotive vehicle.

The over-all heating system is shown in FIGURE 1. The system includes a primary heating means such as the radiator heating element 10 which is commonly used in an automotive vehicle heating system. The radiator heating element 10 is connected to radiator 9 of the automotive vehicle and is associated with a ventilation system 12 which includes fan 13 located adjacent the radiator heating element 10 and conduit 14 which is operatively coupled to the radiator heating element 10 and the passenger compartment 15. The fan 13 directs a stream of air over the radiator heating element 10 and through the conduit 14 into the passenger compartment 15, thereby heating said compartment. In addition to this conventional structure, the invention embodies an instant quick heat means such as electric heating coils 20 which are placed in the conduit 14. The fan 13 directs a stream of air over the radiator heating element 10 and the electric heating coils 20, thereby removing heat from both sources.

The electric coils 20 are connected to an electric circuit 21 which controls the energization of the electric heating coils 20 and the fan 13. The ignition switch 22 and the control switch 23 are connected to the electrical circuit 21 and in part control the energization of the heating coils 20 and the electrical circuit 21, which circuit is hereinafter described in detail.

The electrical circuit 21 (FIGURE 6) includes an alternator 25 which is suitable for use in an automotive vehicle electrical system. The alternator 25 may be a three-phase alternator which includes armature windings (not shown) that are connected by conductors 26, 27, and 28 to feed the electric heating coils 20. The electric heating coils 20 comprise delta-connected coils 29, 30, and 31 which are connected to the conductors 26, 27, and 28. The normally open contacts 32 and 33 are interposed between the conductors 26 and 28 and the electric heating coils 20 and are controlled by a control switch 23 as indicated by the broken line.

Conductors 26, 27, and 28 which are connected to the alternator 25 are also connected to the rectifier 35. The rectifier 35 is a three-phase, full-wave rectifier. It should be understood that the rectifier utilized might be any of the commonly used rectifiers such as a bridge rectifier or the center tap transformer type of rectifier. The rectifier 35 is connected to a conductor 36 which is fixed to ground. A conductor 37 is also connected to the rectifier 35 and forms a positive terminal.

Figure 6:
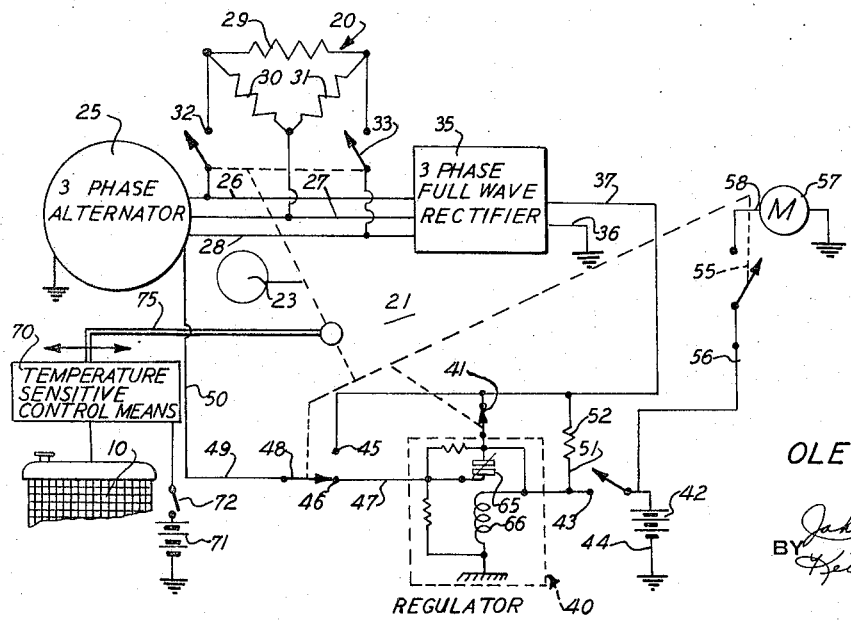
FIGURE 6 is a schematic diagram of the electrical circuit utilized in the quick heat system.

The positive terminal 37 is connected to a regulator circuit 40 through the normally closed contacts 41 which are controlled by the control switch 23 as indicated by the broken line. The regulator circuit 40 shown in FIGURE 6 is a simplified version of the usual regulator. It should be understood that any of the well-known regulators that are commonly used in automotive vehicles such as the one disclosed in U.S. Patent 2,774,842 to Shrader may be used in conjunction with the instant invention. The regulator circuit 40 in the instant invention has a regulated mode of operation and an unregulated mode of operation. In the regulated mode of operation, the regulator circuit 40 functions in the usual manner to limit the voltage applied to the field coils of the alternator 25 by the opening and closing of the normally closed contacts 65 which are actuated by the relay coil 66. The regulator circuit 40 is connected to the battery 42 via switch 43. The battery 42 is connected to the positive terminal 37 of the rectifier by the switch 43, the conductor 51 and the limiting resistor 52 and is also connected to ground by the conductor 44. A charging current will be supplied to the battery 42 through the conductor 51 and the resistor 52 regardless of whether or not the regulator circuit 40 is in a regulated or unregulated mode of operation. The magnitude of the charging current will, of course, be affected by the condition of the regulator circuit.

The positive terminal 37 is connected directly to contact 45 and is connected to contact 46 via switch 41 and the regulator circuit 40. The contact 46 is normally closed by the switch arm 48 that is connected to the conductor 49. The conductor 49 is connected to the conductor 50 which is in turn connected to the field coil (not shown) of the alternator 25. A circuit is, therefore, normally completed from the regulator circuit 40 through the contact 46, the conductor 47, the switch arm 48 to the field coil of the alternator 25.

The control switch 23 is also connected to operate normally open contacts 55 which are connected to the battery 42 via the conductor 56 and to the fan motor 57 of the fan 13 via the conductor 58.

It should be understood that the contacts 32, 33, 41, 45, 46, and 55 may all form part of a five-pole switch. These contacts 32, 33, 41, 45, 46, and 55 are also adapted for automatic control by the temperature sensitive control means 70 which may include a temperature sensitive bimetal placed in the vicinity of the radiator 9 or 10 or in the passenger compartment 15. The bimetal is connected to close a contact (not shown) connected to power source 71 when the temperature of the radiator or the passenger compartment is below a selected value. The power source 71 may be an independent source of power or the battery 42. The closing of the contact causes a circuit to be completed which causes power to be supplied to an actuating means (not shown) such as a solenoid which has a link 75 mechanically connected to the five-pole switch. The energization of the actuating means causes the link 75 to move to the right, closing contacts 32, 33, 45, and 55 and opening contacts 41 and 46, thus placing the heating system in a quick heat mode of operation. When the temperature of the radiator or the passenger compartment reaches the selected value, the bimetal element opens the contact and the actuation means is de-energized causing link 75 to move to the left, opening contacts 32, 33, 45, and 55 and closing contacts 41 and 46. The actuation of manual switch 72 places the system in automatic control.

The above automatic control arrangement is only exemplary of one of the many temperature sensitive automatic controls that might be used in the invention. There are many other similar control systems which are well known in the art.

As previously mentioned, the circuit described above in detail has a regulated and an unregulated mode of operation. During the regulated mode of operation, the circuit performs according to the usual mode of operation which is common to most automotive vehicle electrical systems. The regulator circuit 40 will maintain the field at a selected voltage level, and a charging current may be applied to the battery 42. It is in the unregulated mode of operation that the inventive concept becomes particularly significant. In the unregulated mode of operation, the heater switch 23 has been operated to close the normally open contacts 32, 33, and 55, while opening the normally closed contacts 41 and moving the switch arm 48 from the contact 46 to the contact 45. The closing of the contacts 32 and 33 places the heating coils 20 in circuit so that they may be energized by the alternator 25. The opening of the contacts 41 and the movement of the switch arm 48 to the contact 45 limits the effectiveness of the regulator circuit 40 by causing a relatively low voltage to be applied to the relay coil 66 resulting in contacts 65 remaining closed. This enables a large part of the voltage generated by the alternator 25 to be supplied to the field coil of the alternator 25 and subsequently results in larger generated voltages. The larger generated voltages provide a maximum amount of energy for energizing the electric heating coils 20. The electric heating coils 20 are immediately heated and instantaneously supply heat to the passenger compartment. The closing of the contact 55 energizes the motor 57 which drives the fan 13 (FIGURE 1) to provide a stream of air which flows over the electric heating coils 20; thus the passenger compartment is instantaneously supplied with warm air.

Figure 7:
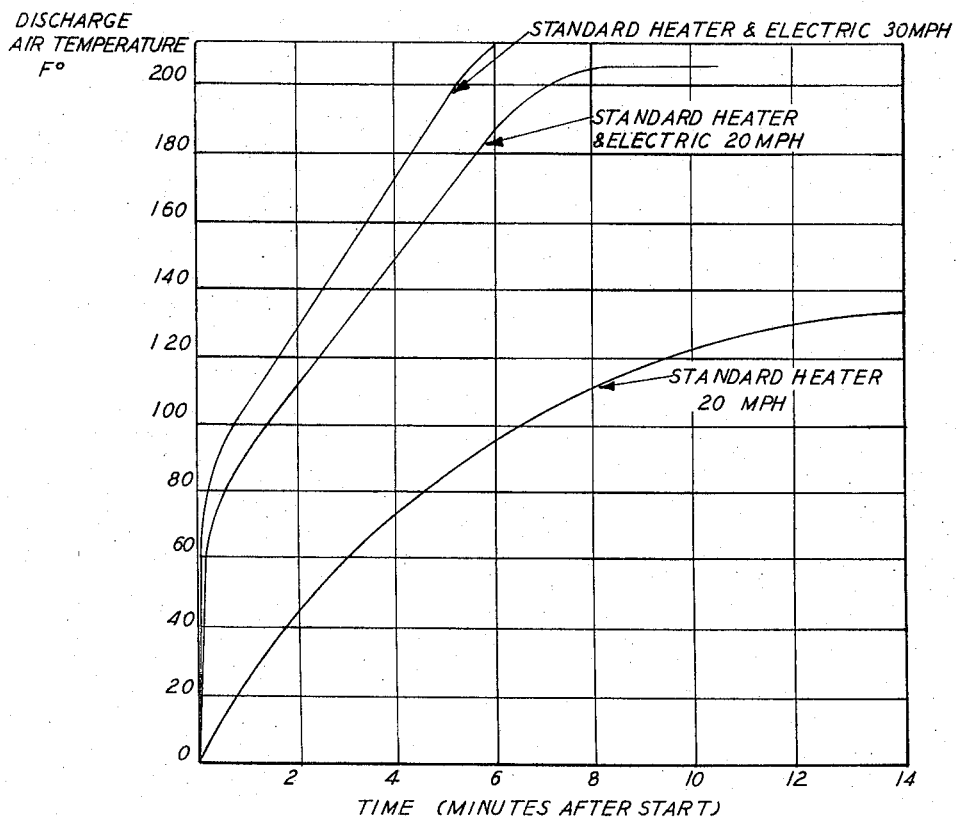
FIGURE 7 is a graph which compares the performance of the electric quick heat system with the ordinary automotive vehicle heating system.

The heating system embodying the principle of the instant invention has been tested on a Ford vehicle. The results of these tests are shown in FIGURE 7. A visual inspection of this figure indicates the superior heating performance which is attained by the adoption of the invented system.

Figure 2:
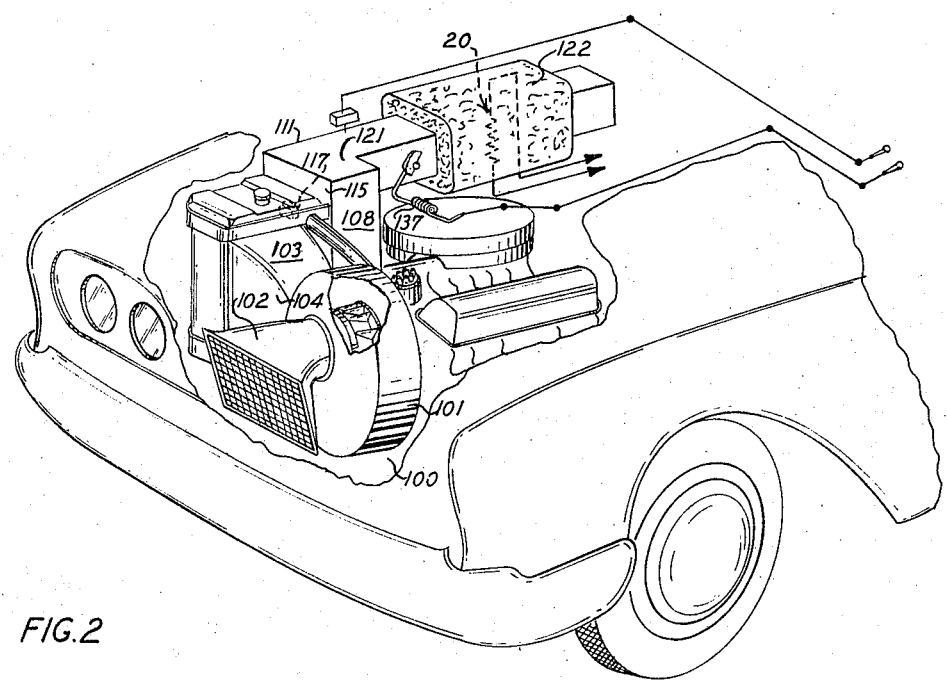
FIGURE 2 is a schematic, perspective diagram of an alternate embodiment of the invention.
Figure 4:
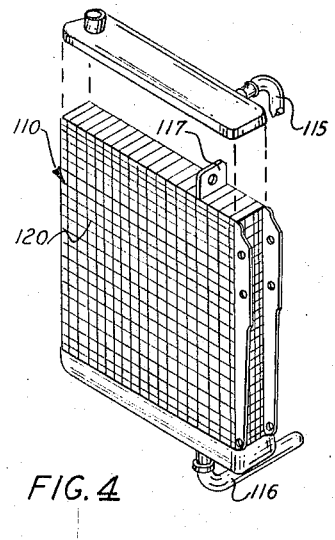
FIGURE 4 is a detail of the radiator and the thermostatic elements utilized in the alternate embodiment of the invention shown in FIGURE 2.
Figure 3:
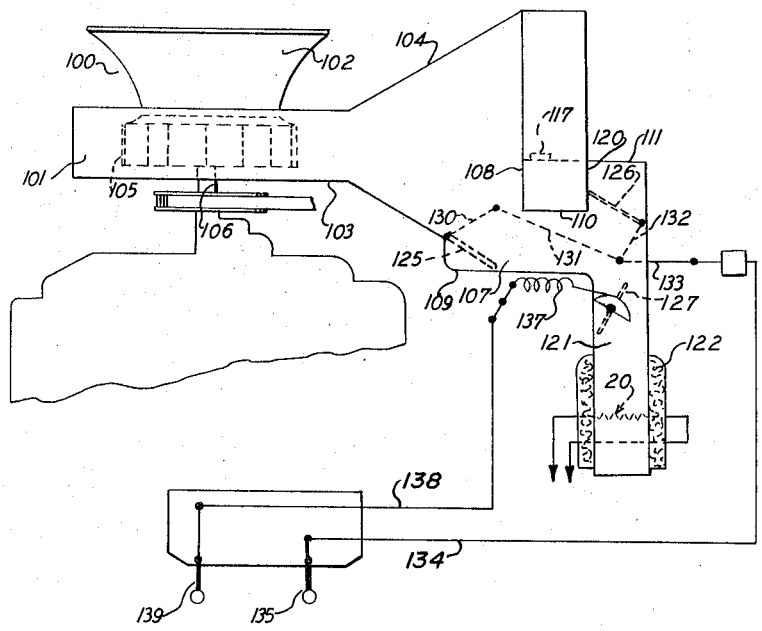
FIGURE 3 is a plan view of the alternate embodiment of the invention.

FIGURES 2, 3 and 4 show an alternate ventilation system that may be used as part of the electric quick heat system. This ventilation system embodies a centrifugal fan 100 having a housing 101 which includes an intake 102, an impeller chamber 103, and a discharge chamber 104. Housed in the impeller chamber 103 in an impeller 105 which is fixed to a shaft 106 which is drivingly connected to the engine of the automotive vehicle. The entire housing 101 is rigidly supported by the automobile frame. A radiator 110 is disposed adjacent to the discharge chamber 104 and cooperates with the discharge chamber to form a bypass channel 107 and a heated air channel 108. The bypass channel 107 is formed by a wall 109 and the side wall of the radiator 110. The heated air channel is formed by the side wall of the radiator 110 and by a wall 111. The radiator 110 is shown in detail in FIGURE 4 and is an integral part of the automotive cooling system. The cooling medium from the engine flows into the radiator inlet 115 (FIGURES 2 and 4) and passes through the body of the radiator to the water outlet 116 which is connected to the water pump (not shown) of the automotive vehicle. The radiator 110 has a thermostatic element 117 that may be disposed between the water inlet and a portion of the cooling surface of the radiator 110. The thermostatic element 117 will generally be closed when the automotive vehicle is running at a relatively low temperature. With the thermostatic element 117 closed, a flow of cooling media will still be provided for a portion of the radiator which serves as the primary heating means for the electric quick heat system. This portion of the radiator is generally designated by the numeral 120.

The bypass channel 107 and the heated air channel 108 merge to form the supply channel 121. The supply channel 121 houses the electric heating coils 20 and is surrounded by a silencer member 122 which minimizes the noise transmitted from the supply channel to the passenger compartment.

The flow of air through the ventilation system is controlled by damper elements 125, 126, and 127. The damper element 125 is pivotally mounted adjacent the bypass channel 107 and adapted to be rotated by the link or cable members 130 and 131. The damper element 126 is pivotally mounted adjacent the heated air channel 108 and adapted to be rotated by the link or cable members 132 and 133. The link 133 is connected to the link 131 and is operated by a link or cable 134 which is connected to the manual control 135. It should be noted that the link 133 may be operated automatically by a temperature sensitive element which would be placed in the supply channel 121 and respond to the temperature of the air moving through the supply channel. The damper element 127 is pivotally mounted in the supply channel 121 and is connected to a resilient member 137 which in turn is connected to a cable member 138 that is adapted to be actuated by the manual control 139.

In operation, the operator of the vehicle may adjust the manual control lever 139 to select the total amount of air which is to be supplied to the passenger compartment. The actuation of the manual control lever 139 causes the damper element 127 to rotate from a position which is normally parallel to the flow of air to a position that obstructs the flow of air in the supply channel 121. The manual control lever 135 may be manipulated to control the temperature of the air supplied to the passenger compartment. The actuation of the manual control lever 135 causes the damper element 126 to rotate in a counterclockwise direction to limit the amount of air which passes through the heated air channel 108. When the damper element 126 is actuated in this manner, the damper element 125 is rotated in a clockwise direction and permits an increased amount of air to flow through the bypass channel 107. The above-described adjustments will subsequently result in a lowering of the temperature of the air which passes through the supply channel 121. The dampers may be manipulated in a reverse manner to cause a temperature increase.

The alternate embodiment of the ventilation system described above has the advantage of utilizing a portion of the radiator that is used in the automotive vehicle cooling system as the primary radiator heating means for the passenger compartment for passenger compartment heating. In addition, this ventilation system provides an improved means for controlling the amount and the temperature of the air supplied to the passenger compartment. The placement of the thermostat in the radiator may also simplify the water pump design and eliminate the usual thermostat.

Figure 5:
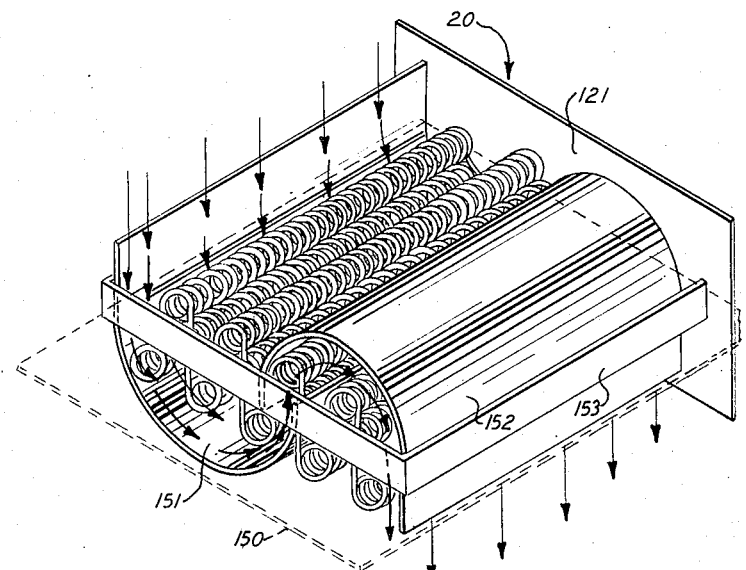
FIGURE 5 is an alternate arrangement of the heater coil and conduit utilized in the electric quick heat system.

The heating coils 20 placed in the supply channel of the ventilation system may be arranged in a parallel manner having a supply of air flow directly over the heating coils 20 and into the passenger compartment. In FIGURE 5, an alternate arrangement of heater coils 20 is shown. In this arrangement, the heater coil plane 150 is placed perpendicular to the flow of the entering air. The heating coils 20 are surrounded by two overlapping, curved baffle members 151 and 152. The baffle members 151 and 152 are fixed to a bracket 153 which in turn is supported by a portion of the supply channel 121. In this arrangement, the air follows a curving path as it passes over the coils 20. This configuration provides a substantially longer flow path for the air per unit of length along the heater coil plane 150. It should be understood that it is within the scope of the invention to rotate the heater coil plane 90° so that the heater coil plane 150 is parallel to the flow of entering air or 180° or to any other angle that the design might require.

It will be understood that the invention is not to be limited to the exact construction shown and described and that various changes and modifications may be made without departing from the spirit and scope of the invention, as defined in the appended claims.

I claim:

1. In an automotive vehicle, a passenger compartment, an electrical generator capable of regulated and unregulated modes of operation with respect to electrical energy output, means coupled to said generator for causing said electrical generator to operate either in its regulated mode or its unregulated mode in response to an external signal, an electrical heater means positioned in communication with said passenger compartment and capable of producing a substantial amount of heat for an automotive vehicle passenger compartment when said generator is operated in its unregulated mode, and means coupled to said first mentioned means and said electrical heater means for connecting said electrical generator to said electrical heating means when said electrical generator is operated in its unregulated mode and for disconnecting said electrical heater means from said electrical generator when said electrical generator is operated in its regulated mode.

2. In an automotive vehicle, a passenger compartment, an electrical generator, means coupled to said electrical generator for sensing and regulating the output of said generator, means operable in response to an external signal and coupled to said electrical generator and said first mentioned means for limiting the effectiveness of said first mentioned means and for operating said electrical generator in its unregulated state of operation, an electrical heater means positioned in communication with said passenger compartment and capable of supplying a substantial amount of heat to said passenger compartment when said electrical generator is operated in its unregulated state of operation, and means operable with said second mentioned means for electrically coupling said electrical generator with said electrical heater means when said electrical generator is operated in its unregulated state of operation and for electrically decoupling said electrical heater means from said electrical generator when said electrical generator is operated in its regulated state of operation.

3. In an automotive vehicle, a passenger compartment, an electrical generator having an output circuit and a field winding, means coupled to said output circuit and said field winding for sensing the output of said electrical generator and for limiting the energization of said field winding thereby limiting the output of said electrical generator whereby said electrical generator is operated in a regulated mode, an electrical heater means positioned to heat said passenger compartment, and means coupled to said first mentioned means for rendering said first mentioned means inoperative in response to an external signal and for supplying at least a portion of the output of said electrical generator directly to said field whereby said electrical generator is operated in an unregulated regenerative mode, said electrical heater means being capable of supplying a substantial amount of electrical energy to said passenger compartment when said electrical generator is operating in its unregulated regenerative mode, and means coupled to said last mentioned means for coupling said output circuit of said electrical generator with said electrical heating means when said electrical generator is operated in its unregulated regenerative mode and for decoupling said output circuit of said electrical generator from said electrical heater means when said electrical generator is operated in its regulated mode.

4. In an automotive vehicle, a passenger compartment, an electrical generator having an output circuit and a field winding, a feedback control circuit coupling said output circuit and said field winding, said feedback control circuit including limiter means for sensing the output voltage of said electrical generator and for limiting the amount of electrical energy applied to said field winding thereby limiting the output of said generator, and means for bypassing said limiter means and for applying a substantially greater portion of the output of said electrical generator to said field winding, electrical heating means positioned in communication with said passenger compartment, said electrical heater means being capable of supplying a substantial amount of heat to said passenger compartment when said limiter means is bypassed, and control means operable in response to external signals coupled to said feedback control circuit for coupling and decoupling said means for bypassing said limiter means in said feedback control circuit and for coupling said electrical heater means with said output circuit of said electrical generator when said means for bypassing said limiter means is coupled in said feedback control circuit and for decoupling said electrical heater means from said output circuit of said electrical generator when said means for bypassing said limiter means is decoupled from said feedback control circuit.

5. In a heating system for an automotive vehicle, a passenger compartment, a generator operated by said vehicle, an electrical load including a vehicle storage battery connectable to said generator, control means coupled to said generator for operating said generator in either a regulated or an unregulated mode with respect to electrical energy output, the output of said generator being substantially higher when operated in the unregulated mode, an electrical heater positioned in communication with said passenger compartment and capable of supplying a substantial amount of heat to said passenger compartment when said generator is operated in the unregulated mode, and means coupled to said control means for electrically coupling said electrical heater to said generator when said control means operates said generator in the unregulated mode and for decoupling said electrical heater from said electrical generator when said control means operates said generator in the regulated mode.

6. In an automotive vehicle, a passenger compartment, an electric heater means positioned to supply heat to said passenger compartment, an alternator comprising an alternating current output winding, a field winding and a rectifier connected to said output winding, a vehicle electrical system including a storage battery connected to said rectifier, a regulator coupled to said rectifier and said field winding for limiting the amount of electrical energy supplied to said field winding and thereby the output of electrical energy from said output windings whereby said alternator is operated in a regulated mode, means coupling said rectifier and said field winding for operating said alternator in a regenerative unregulated mode, and means coupled to said regulator and said last mentioned means for causing said alternator to operate either in its regulated or unregulated mode of operation, said alternator furnishing sufficient electrical energy to said electric heater means when operated in the unregulated mode to cause a substantial amount of heat to be supplied to said passenger compartment of said vehicle, and means coupled to said last mentioned means for coupling said electrical heater means to the output winding of said alternator when said alternator is operated in its unregulated mode of operation and for decoupling said electric heater means from said output winding of said alternator when said alternator is operated in its regulated mode of operation.

7. In an automotive vehicle, a passenger compartment, an electric heater means positioned to supply heat to said passenger compartment, an alternator comprising an alternating current output winding, a rectifier connected to said output winding and control means for varying the output of said output winding in response to varying energization of said control means, a regulator coupled to said rectifier and said control means for limiting the amount of electrical energy supplied to said control means and thereby the output of electrical energy from said output windings whereby said alternator is operated in a regulated mode, means coupling said rectifier and said control means for operating said alternator in a regenerative unregulated mode, and control means coupled to said regulator and said last mentioned means for causing said alternator to operate either in its regulated or unregulated mode of operation, said alternator furnishing sufficient electrical energy to said electric heater means when operated in the unregulated mode to cause a substantial amount of heat to be supplied to said passenger compartment of said vehicle, and means coupled to said control means for coupling said electrical heater means to the output winding of said alternator when said alternator is operated in its unregulated mode of operation and for decoupling said electric heater means from said output winding of said alternator when said alternator is operated in its regulated mode of operation.

8. In an automotive vehicle the combination comprising, a passenger compartment, a heating system including a radiator heating means, a ventilation system for supplying the heat of the radiator heating means to said passenger compartment, an electrical system including an electrical generator having a control means, an electrical storage battery and a regulator circuit said control means controlling the electrical energy output of said electrical generator, connected in circuit, said regulator circuit normally limiting the amount of electrical energy applied to said control means of said electrical generator thereby limiting the output of said electrical generator, an electric quick heat means operatively placed in said ventilation system to supply heat to the passenger compartment, and circuit means operable in response to an external signal for reducing the effectiveness of said regulator circuit to limit the electrical energy applied to said control means and for raising the output of said electrical generator substantially over that produced when said regulator circuit operates to limit the energy supplied to said control means, and means coupled to said circuit means for coupling said electric quick heat means to said electrical generator when said circuit means reduces the effectiveness of said regulator circuit and for decoupling said electric quick heat means from said electrical generator when said regulator circuit operates to limit the energy supplied to said control means.

9. In an automotive vehicle, a passenger compartment, a heating system including a primary heating means, a ventilation system for supplying the heat of said primary heating means to said passenger compartment, an electrical system including an electrical generator having a field, an electrical storage battery and a regulator circuit connected in circuit, said regulator circuit normally limiting the amount of electrical energy applied to the field of said electrical generator, an electric quick heat means operatively placed in said ventilation system to supply heat to the passenger compartment and coupled to said electrical generator, a sensing means for sensing when said primary heating means has reached a given operating temperature, and a control circuit means for reducing the effectiveness of said regulator circuit to limit the electrical energy applied to said field when said sensing means senses a temperature below said operating temperature and for returning the regulator circuit to normal operation when said sensing means senses a temperature above said given operating temperature, said control circuit means connected to said sensing means to be operated by said sensing means.

10. In an automotive vehicle, a passenger compartment, an internal combustion engine for operating said automotive vehicle, means including a circulating liquid coolant system for cooling said engine, a radiator heating means connected to said circulating liquid coolant system and positioned to deliver heat to said passenger compartment, an electrical system for said vehicle including a load and a storage battery, an electrical generating means for supplying electrical energy to said load and storage battery, said electrical generating means including an output circuit and a control means for controlling the output of said electrical generating means in response electrical energy supplied thereto, a regulator means coupled to said output circuit and said control means for limiting the electrical energy supplied to said control means and hence the output energy of said electrical generating means whereby said electrical generating means is operated in the regulated mode, means coupled to said output circuit and said control means for limiting the effectiveness of said regulator means and for operating said electrical generating means in a regenerative unregulated mode in which the output of said electrical generating means is substantially greater than when operated in the regulated mode, an electrical quick heat means coupled to the output circuit of said electrical generating means for delivering a substantial amount of heat to said passenger compartment of said vehicle when said electrical generating is operated in the unregulated mode, a sensing means coupled to sense the temperature of the liquid coolant supplied to said radiator heating means, and means coupled to said sensing means, and acting on said regulator means and said means for limiting the effectiveness of said regulator means and for operating said electrical generating means in the regenerative unregulated mode for causing said electrical generating means to operate in the unregulated mode when the temperature of said engine coolant is below a predetermined temperature and for causing said electrical generating means to operate in the regulated mode when the temperature of said engine coolant exceeds said predetermined temperature.

11. In an automotive vehicle, a passenger compartment, an internal combustion engine for operating said automotive vehicle, means including a circulating liquid coolant system for cooling said engine, a radiator heating means connected to said circulating liquid coolant system and positioned to deliver heat to said passenger compartment, an electrical system for said vehicle including a load and a storage battery, an electrical generating means for supplying electrical energy to said load and storage battery, said electrical generating means including an output circuit and a control means for controlling the output of said electrical generating means in response to electrical energy supplied thereto, a regulator means coupled to said output circuit and said control means for limiting the electrical energy supplied to said control means and hence limiting the output energy of said electrical generating means whereby said electrical generating means is operated in the regulated mode, means coupled to said output circuit and said control means for limiting the effectiveness of said regulator means and for operating said generator in a regenerative unregulated mode in which the output of said electrical generating means is substantially greater than when operated in the regulated mode, control means capable of being actuated by an external signal coupled to said regulator means and to said last mentioned means for operating said electrical generating means in the unregulated mode when actuated, an electrical quick heat means coupled to the output circuit of said electrical generating means and positioned to deliver heat to the passenger compartment of said vehicle, a sensing means coupled to sense the temperature of the liquid coolant supplied to said radiator heating means and coupled to said last mentioned control means for de-activating said control means and causing said electrical generating means to operate in the regulated mode when said sensing means senses an engine coolant temperature at which said radiator heating means is capable of supplying adequate heat to said passenger compartment.

12. In an automotive vehicle, a passenger compartment, an internal combustion engine for operating said automotive vehicle, means including a circulating liquid coolant system for cooling said engine, a radiator heating means connected to said circulating liquid coolant system and positioned to deliver heat to said passenger compartment, an electrical system for said vehicle including a load and a storage battery, an alternator for supplying electrical energy to said load and storage battery, said alternator including an output circuit comprising an alternating current output winding and a rectifier connected to said output winding, said load and storage battery coupled to said rectifier, said alternator also including a control means for controlling the output of said alternator in response to an energizing signal, a regulator means coupled to said output circuit and said control means for limiting the electrical energy supplied to said control means and hence limiting the output energy of said alternator whereby said alternator is operated in the regulated mode, means coupled to said output circuit and said control means for limiting the effectiveness of said regulator means and for operating said generator in a regenerative unregulated mode in which the output of said alternator is substantially greater than when operated in the regulated mode, control means capable of being actuated by an external signal coupled to said regulator means and to said last mentioned means for operating said alternator in the unregulated mode when actuated, an electrical quick heat means coupled to the alternating current output winding of said alternator and positioned to deliver heat to the passenger compartment of said vehicle, a sensing means coupled to sense the temperature of the liquid coolant supplied to said radiator heating means and coupled to said last mentioned control means for de-activating said control means and causing said alternator to operate in the regulated mode when said sensing means senses an engine coolant temperature at which said radiator heating means is capable of supplying adequate heat to said passenger compartment.

13. In an automotive vehicle, the combination comprising, an electrical generating means for generating electrical power, a regulator circuit means for limiting the voltage generated by said electrical generating means, said regulator circuit means connected in circuit with said electrical generating means, a heating system including a primary heating means which requires a finite period before being capable of contributing substantial amounts of heat to the passenger compartment of the automotive vehicle, an electric quick heat means for instantly dispensing substantial amounts of heat when operated, said electric quick heat means adapted to be operatively coupled to said electrical generating means, a control means for automatically and operatively coupling said electric quick heat means to said electrical generating means when a given temperature of said primary heating means is sensed and for limiting the effectiveness of said regulator circuit means when said electric quick heat means is connected in circuit with said electrical generating means, said control means connected in circuit with said regulator circuit means and said electrical generating means, said control means operatively coupled to said primary heating means to sense the temperature of said primary heating means and operatively coupled to said quick heat means and to said electrical generating means to connect said electrical generating means in circuit with said electric quick heat means when a given temperature is sensed.

14. The structure defined by claim 13 wherein the automotive vehicle has a passenger compartment, a conduit coupling said electric quick heat means and said primary heating means to said passenger compartment, and means to force air through said conduit and over said primary heating means and said electric quick heat means.

15. The structure defined by claim 14 wherein the primary heating means is part of the radiator of the automotive cooling system and said last mentioned means is adapted to direct air over said radiator.

16. The structure defined by claim 15 wherein said radiator of the automotive cooling system has a thermosensitive element interposed between two portions of said radiator, said thermosensitive element having an open position which permits cooling media to circulate throughout said radiator and a closed position which permits cooling media to circulate only in a portion of said radiator which forms such primary heating means.

17. In an automotive vehicle, the combination comprising, a heating system including a radiator heating means, a ventilation system for supplying the heat of the radiator heating means to the passenger compartment, an electrical system including an alternator having a field, a rectifier and a regulator circuit connected in circuit, said regulator circuit normally limiting the amount of voltage applied to the field of said alternator, an electric quick heat means for instantly supplying heat to the passenger compartment when operatively coupled to said alternator, said electric quick heat means operatively placed in said ventilation system to supply heat to the passenger compartment and adapted to be operatively coupled to said alternator, a sensing means for sensing when said radiator heating means has reached a given operating temperature and a control circuit means for reducing the effectiveness of said regulator circuit to regulate the voltage applied to the field and for operatively coupling said electric quick heat means to said alternator when said sensing means senses a temperature below said operating temperature, said control circuit means disconnecting said electric quick heat means from said alternator and returning the regulator circuit to normal operation when said sensing means senses a temperature above said given operating temperature, said control circuit means connected to said sensing means to be operated by said sensing means.

18. In an automotive vehicle, the combination comprising, a heating system including a radiator heating means, a ventilation system for supplying the heat of the radiator heating means to the passenger compartment, an electrical system including an electrical generator having a field, a rectifier and a regulator circuit connected in circuit, said regulator circuit normally limiting the amount of voltage applied to the field of said electrical generator, an electric quick heat means for instantly supplying heat to the passenger compartment when operatively coupled to said electrical generator, said electric quick heat means operatively placed in said ventilation system to supply heat to the passenger compartment and adapted to be operatively coupled to said electrical generator, a sensing means for sensing when said radiator heating means has reached a given operating temperature and a control circuit means for reducing the effectiveness of said regulator circuit to regulate the voltage applied to said field and for operatively coupling said electric quick heat means to said electrical generator when said sensing means senses a temperature below said operating temperature, said control circuit means disconnecting said electric quick heat means from said generator and returning the regulator circuit to normal operation when said sensing means senses a temperature above said given operating temperature, said control circuit means connected to said sensing means to be operated by said sensing means.

References Cited by the Examiner

UNITED STATES PATENTS

| 2,158,733 | 5/1939 | Sola | 219—202 X |
| 2,827,540 | 3/1958 | Underwood | 219—279 |
| 2,828,426 | 3/1958 | Rice | 307—10 |
| 3,037,124 | 5/1962 | Carlson | 307—10 X |

ANTHONY BARTIS, *Primary Examiner.*